US 11,941,531 B1

United States Patent
Arik et al.

(10) Patent No.: US 11,941,531 B1
(45) Date of Patent: Mar. 26, 2024

(54) ATTENTION-BASED PROTOTYPICAL LEARNING

(71) Applicant: Google LLC, Mountain View, CA (US)

(72) Inventors: Sercan Omer Arik, San Francisco, CA (US); Tomas Jon Pfister, Foster City, CA (US)

(73) Assignee: Google LLC, Mountain View, CA (US)

( * ) Notice: Subject to any disclaimer, the term of this patent is extended or adjusted under 35 U.S.C. 154(b) by 1085 days.

(21) Appl. No.: 16/785,032

(22) Filed: Feb. 7, 2020

Related U.S. Application Data (60) Provisional application No. 62/802,663, filed on Feb. 7, 2019.

(51) Int. Cl.
*G06N 3/088* (2023.01)
*G06F 40/30* (2020.01)
*G06N 3/045* (2023.01)

(52) U.S. Cl.
CPC ............. *G06N 3/088* (2013.01); *G06F 40/30* (2020.01); *G06N 3/045* (2023.01)

(58) Field of Classification Search
CPC ......... G06N 3/088; G06N 3/045; G06F 40/30
See application file for complete search history.

(56) References Cited

U.S. PATENT DOCUMENTS

2017/0357720 A1* 12/2017 Torabi ................. G06F 16/7844

FOREIGN PATENT DOCUMENTS

WO WO-2017201444 A1 * 11/2017 ........... G06K 9/6202

OTHER PUBLICATIONS

Vinyals et al., "Matching Networks for One Shot Learning," arXiv:1606.04080v2 [cs.LG] Dec. 29, 2017 (Year: 2017).*
Kitaev et al., "Constituency Parsing with a Self-Attentive Encoder," arXiv:1805.01052v1 [cs.CL] May 2, 2018 (Year: 2018).*
Hu et al., "CAN: Constrained Attention Networks for Multi-Aspect Sentiment Analysis," arXiv: 1812.10735v1 [cs.CL] Dec. 27, 2018 (Year: 2018).*

(Continued)

*Primary Examiner* — Miranda M Huang
*Assistant Examiner* — Yao David Huang
(74) *Attorney, Agent, or Firm* — Honigman LLP; Brett A. Krueger (57) ABSTRACT

Methods, systems, and apparatus, including computer programs encoded on a computer storage medium, for processing an input data element to generate a prediction output that characterizes the input data element. In one aspect, a method comprises: determining a respective attention weight between an input data element and each of a plurality of reference data elements; processing each of the reference data elements using the encoder neural network to generate a respective value embedding of each reference data element; determining a combined value embedding of the reference data elements based on (i) the respective value embedding of each reference data element, and (ii) the respective attention weight between the input data element and each reference data element; and processing the combined value embedding of the reference data elements using a prediction neural network to generate the prediction output that characterizes the input data element.

19 Claims, 4 Drawing Sheets

(56) References Cited

OTHER PUBLICATIONS

Khanna, Ritvik, "Comparative Study of Classifiers in predicting the Income Range of a person from a census data," Towards Data Science, Dec. 10, 2018. <https://towardsdatascience.com/comparative-study-of-classifiers-in-predicting-the-income-range-of-a-person-from-a-census-data-96ce60ee5a10> (Year: 2018).*
Chen et al., "This Looks Like That: Deep Learning for Interpretable Image Recognition," arXiv:1806. 10574v3 [cs.LG] Dec. 19, 2018 ( Year: 2018).*
Hajiabadi et al., "On Extending Neural Networks with Loss Ensembles for Text Classification," arXiv: 1711.05170v1 [cs.CL] Nov. 14, 2017 (Year: 2017).*
Martins et al., "From Softmax to Sparsemax: A Sparse Model of Attention and Multi-Label Classification," Proceedings of the 33 rd International Conference on Machine Learning, New York, NY, USA, 2016. (Year: 2016).*
Arpit et al., "A closer look at memorization in deep networks", arXiv:1706.05394v2, Jul. 2017, 10 pages.
Bahdanau et al., "Neural machine translation by jointly learning to align and translate", arXiv:1409.0473v7, May 2016, 15 pages.
Bien et al., "Prototype selection for interpretable classification", The Annals of Applied Statistics, 2011, pp. 2403-2424.
Chen et al., "This looks like that: deep learning for interpretable image recognition", Advances in Neural Information Processing Systems, 2019, pp. 8928-8939.
Conneau et al., "Very Deep Convolutional Networks for Text Classification", arXiv:1606.01781v2, Jan. 2017, 10 pages.
Cui et al., "Fine-grained categorization and dataset bootstrapping using deep metric learning with humans in the loop", Proceedings of the IEEE Conference on Computer Vision and Pattern Recognition, 2016, 10 pages.
Dorogush et al., "CatBoost: gradient boosting with categorical features support", arXiv:1810.11363v1, Oct. 2018, 7 pages.
Erhan et al., "Visualizing Higher-Layer Features of a Deep Network", University of Montreal, 2009, 1341(3):1.
Guo et al., "On Calibration of Modern Neural Networks", arXiv:1706.04599v2, Aug. 2017, 14 pages.
Haenssle, Holger A., et al. "Man against machine: diagnostic performance of a deep learning convolutional neural network for dermoscopic melanoma recognition in comparison to 58 dermatologists." Annals of Oncology, 2018, 29(8): 1836-1842.
He et al., "Deep residual learning for image recognition", Proceedings of the IEEE Conference on Computer Vision and Pattern Recognition, 2016, pp. 770-778.
Hochreiter et al., "Long Short Term Memory", Neural Computation, 1997, 9(8):1735-1780.
Hoffer et al., "Deep Metric Learning using Triplet Network", arXiv:1412.6622v4, Dec. 2018, 8 pages.
ISIC Archive, 2016, retrieved from URL<http://www.isic-archive.com/>.
Jerant et al., "Early Detection and Treatment of Skin Cancer", American Family Physician, Jul. 2000, 62(2):357-368.
Jiang et al., "To trust or not to trust a classifier", Advances in Neural Information Processing Systems, 2018, pp. 5541-5552.
Kendall et al., "What uncertainties do we need in bayesian deep learning for computer vision?", Advances in Neural Information Processing Systems, 2017, pp. 5574-5584.
Kim et al., "Attention based ensemble for deep metric learning", Proceedings of the European Conference on Computer Vision, 2018, pp. 736-751.
Kim et al., "Interpretability beyond feature attribution quantitative testing with concept activation vectors (TCAV)" arXiv:1711.11279v5, Jun. 2018, 18 pages.
Kingma et al., "Adam: A method for stochastic optimization." arXiv:1412.6980, Jan. 2017, 15 pages.
Koh et al., "Understanding black box predictions via influence functions", arXiv:1703.04730v2, Jul. 2017, 11 pages.
Lei Ba et al., "Layer normalization", arXiv:1607.06450v1, Jul. 2016, 14 pages.
Li et al. "Deep learning for case-based reasoning through prototypes: A neural network that explains its predictions." Thirty-Second AAAI Conference on Artificial Intelligence, 2018, 8 pages.
Martins et al., "From softmax to sparsemax: A sparse model of attention and multi-label classification." International Conference on Machine Learning, 2016, pp. 1614-1623.
Miller, George A. "The magical number seven, plus or minus two: Some limits on our capacity for processing information." Psychological review 101.2, 1994, pp. 343.
Mullachery et al., "Bayesian neural networks." arXiv:1801.07710, 2018, 16 pages.
Mureşan, Horea, and Mihai Oltean. "Fruit recognition from images using deep learning." Acta Universitatis Sapientiae, Informatica 10.1, 2018, pp. 26-42.
Papernot et al., "Deep k-nearest neighbors: Towards confident, interpretable and robust deep learning." arXiv:1803.04765, Mar. 2018, 18 pages.
Ren et al. "Incremental few-shot learning with attention attractor networks." Advances in Neural Information Processing Systems, 2019, pp. 5278-5286.
Sabour et al., "Dynamic routing between capsules." Advances in neural information processing systems, 2017, pp. 3856-3866.
Sachan et al., "Revisiting LSTM networks for semi-supervised text classification via mixed objective function." Proceedings of the AAAI Conference on Artificial Intelligence. 2019, 33:6940-6948.
Simonyan et al., "Deep inside convolutional networks: Visualising image classification models and saliency maps." arXiv:1312.6034, 2013, 8 pages.
Snell et al., "Prototypical networks for few-shot learning." Advances in neural information processing systems, 2017, 11 pages.
Sohn et al., "Improved deep metric learning with multi-class n-pair loss objective." Advances in neural information processing systems, 2016, pp. 1857-1865.
Vaswani et al. "Attention is all you need." Advances in neural information processing systems, 2017, pp. 5998-6008.
Vinyals et al. "Matching networks for one shot learning." Advances in neural information processing systems, 2016, pp. 3630-3638.
Wan, Li, et al. "Regularization of neural networks using dropconnect." International conference on machine learning, 2013, pp. 1058-1066.
Yeh et al. "Representer point selection for explaining deep neural networks." Advances in Neural Information Processing Systems, 2018, pp. 9291-9301.
Zeiler et al., "Visualizing and understanding convolutional networks." European conference on computer vision. Springer, Cham, 2014, pp. 818-833.
Zhang et al., "Interpretable convolutional neural networks." Proceedings of the IEEE Conference on Computer Vision and Pattern Recognition, 2018, pp. 8827-8836.
Zhang et al., "Text understanding from scratch." arXiv:1502.01710, 2015, 10 pages.

* cited by examiner

ATTENTION-BASED PROTOTYPICAL LEARNING

CROSS REFERENCE TO RELATED APPLICATION

This application is claims priority under 35 U.S.C. 119 to Provisional Application No. 62/802,663, filed Feb. 7, 2019, which is incorporated by reference.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep learning models that employ multiple layers of processing units to generate an output for a received input. For example, a deep neural network is a deep learning model that includes an output layer and one or more hidden layers that each apply a non-linear transformation to a received input to generate an output.

SUMMARY

This specification describes a system implemented as computer programs on one or more computers in one or more locations that processes an input data element to generate a prediction output.

According to one aspect there is provided a method performed by one or more data processing apparatus. The method includes determining a respective attention weight between an input data element and each of a plurality of reference data elements. The input data element is processed using an encoder neural network to generate a query embedding of the input data element. Each of the reference data elements is processed using the encoder neural network to generate a respective key embedding of each reference data element. For each reference data element, the attention weight between the input data element and the reference data element is determined based on a measure of alignment between the query embedding of the input data element and the key embedding of the reference data element. A prediction output is generated that characterizes the input data element based on at least the attention weights and the reference data elements. Each of the reference data elements is processed using the encoder neural network to generate a respective value embedding of each reference data element. A combined value embedding of the reference data elements is determined based on (i) the respective value embedding of each reference data element, and (ii) the respective attention weight between the input data element and each reference data element. The combined value embedding of the reference data elements is processed using a prediction neural network to generate the prediction output that characterizes the input data element.

In some implementations, the input and reference data elements are respective images, and the prediction output characterizes a type of object depicted in the input image.

In some implementations, the input and reference data elements are respective sequences of characters or words in a natural language, and the prediction output defines a topic of the input sequence of characters or words.

In some implementations, the input and reference data elements are respective tabular data comprising categorical and numerical features, and the prediction output defines a class of the input tabular data.

In some implementations, the encoder neural network includes a query embedding neural network that is configured to generate query embeddings, a key embedding neural network that is configured to generate key embeddings, and a value embedding neural network that is configured to generate value embeddings.

In some implementations, determining the attention weights between the input data element and the reference data elements includes: determining the respective measure of alignment between the query embedding of the input data element and the key embedding of each reference data element; and processing the measures of alignment using a normalization function.

In some implementations, the normalization function is a softmax function or a sparsemax function.

In some implementations, determining the measure of alignment between the query embedding of the input data element and the key embedding of a particular reference data element includes determining a dot product between the query embedding of the input data element and the key embedding of the particular reference data element.

In some implementations, determining a combined value embedding of the reference data elements includes: for each reference data element, scaling the value embedding of the reference data element by the attention weight between the input data element and the reference data element; and summing the scaled value embeddings of the reference data elements.

In some implementations, each reference data element is associated with a respective label that characterizes the reference data element, and the method further includes determining a confidence of the prediction output that characterizes the input data element based on: (i) the labels of the reference data elements, and (ii) the attention weights between the input data element and the reference data elements.

In some implementations, the method further includes: identifying a proper subset of the reference data elements as prototype reference data elements based on the attention weights; and providing the prototype reference data elements for use in interpreting the prediction output that characterizes the input data element.

In some implementations, the method further includes: determining gradients of a loss function with respect to parameters of one or both of the encoder neural network and the prediction neural network, where the loss function includes a first loss function term that characterizes a difference between: (i) a label that characterizes the input data element, and (ii) the prediction output that characterizes the input data element; and using the gradients of the loss function to adjust values of the parameters of one or both of the encoder neural network and the prediction neural network.

In some implementations, the method further includes: processing the input data element using the encoder neural network to generate a value embedding of the input data element; and processing the value embedding of the input data element using the prediction neural network to generate a second prediction output that characterizes the input data element. The loss function includes a second loss function term that characterizes a difference between: (i) the label that characterizes the input data element, and (ii) the second prediction output that characterizes the input data element.

In some implementations, the method further includes processing a combination of the value embedding of the input data element and the combined value embedding of the reference data elements using the prediction neural network to generate a third prediction output that characterizes the input data element. The loss function includes a third loss function term that characterizes a difference between: (i) the label that characterizes the input data element, and (ii) the third prediction output that characterizes the input data element.

In some implementations, the loss function includes a sparsity regularization loss function term that encourages sparsity of the attention weights between the input data element and each of the reference data elements.

According to another aspect there is provided a system including: one or more computers; and one or more storage devices communicatively coupled to the one or more computers, where the one or more storage devices store instructions that, when executed by the one or more computers, cause the one or more computers to perform the operations of the previously described method.

According to another aspect there are provided one or more non-transitory computer storage media storing instructions that when executed by one or more computers cause the one or more computers to perform the operations of the previously described method.

Particular embodiments of the subject matter described in this specification can be implemented so as to realize one or more of the following advantages.

The system described in this specification can generate a prediction output that accurately characterizes an input data element. Moreover, along with the prediction output, the system can also generate data that enables a user to interpret the rationale used to generate the prediction output. In particular, the system can output a respective attention weight between the input data element and each of multiple reference data elements. The attention weight corresponding to a reference data element characterizes the "importance" the system accorded to the reference data element in generating the prediction output for the input data element. A user of the system can interpret the rationale used to generate the prediction output by reviewing a set of "prototype" reference data elements with the highest attention weights.

The system described in this specification can generate a confidence measure that characterizes the confidence of the system in a prediction output characterizing an input data element, via quantification of the agreement of prototype labels. A user of the system can use the confidence measures generated by the system in determining the amount of uncertainty in the prediction outputs generated by the system. Confidence quantification can also enable detection of out-of-di stributi on samples.

The system described in this specification may be robust to "label noise" in the reference data elements, that is, can be effectively trained even when the labels (i.e., classes) associated with some of the reference data elements are incorrect. In particular, the system can be trained using a sparsity-inducing loss function that encourages the attention weights corresponding to many of the reference data elements to be zero. This enables the system to generate a prediction output for an input data element that relies on only a few reference data elements, thereby making it less likely that the prediction output will be influenced by a mislabeled reference data element.

The advantages of the system described in this specification make it suitable to be deployed for use in a wider range of applications than some conventional systems. For example, the interpretability and confidence measures associated with the prediction outputs generated by the system make it suitable for deployment in application areas such as healthcare and financial services.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a neural network system that processes an input data element (e.g., image, text, tabular, or audio data) to generate a corresponding prediction output (e.g., a classification output). To generate the prediction output, the neural network system determines a respective "attention weight" between the input data element and each of multiple reference data elements, and then generates the prediction output based on: (i) the attention weights, and (ii) the reference data elements. The attention weight corresponding to a reference data element characterizes the importance the neural network system accords to the reference data element in generating the prediction output for the input data element. A user of the neural network system can use the attention weights to interpret the rationale used by the neural network system to generate the prediction output, e.g., by manually examining a set of "prototype" reference data elements having the highest attention weights. These features and other features are described in more detail below.

Figure 1:
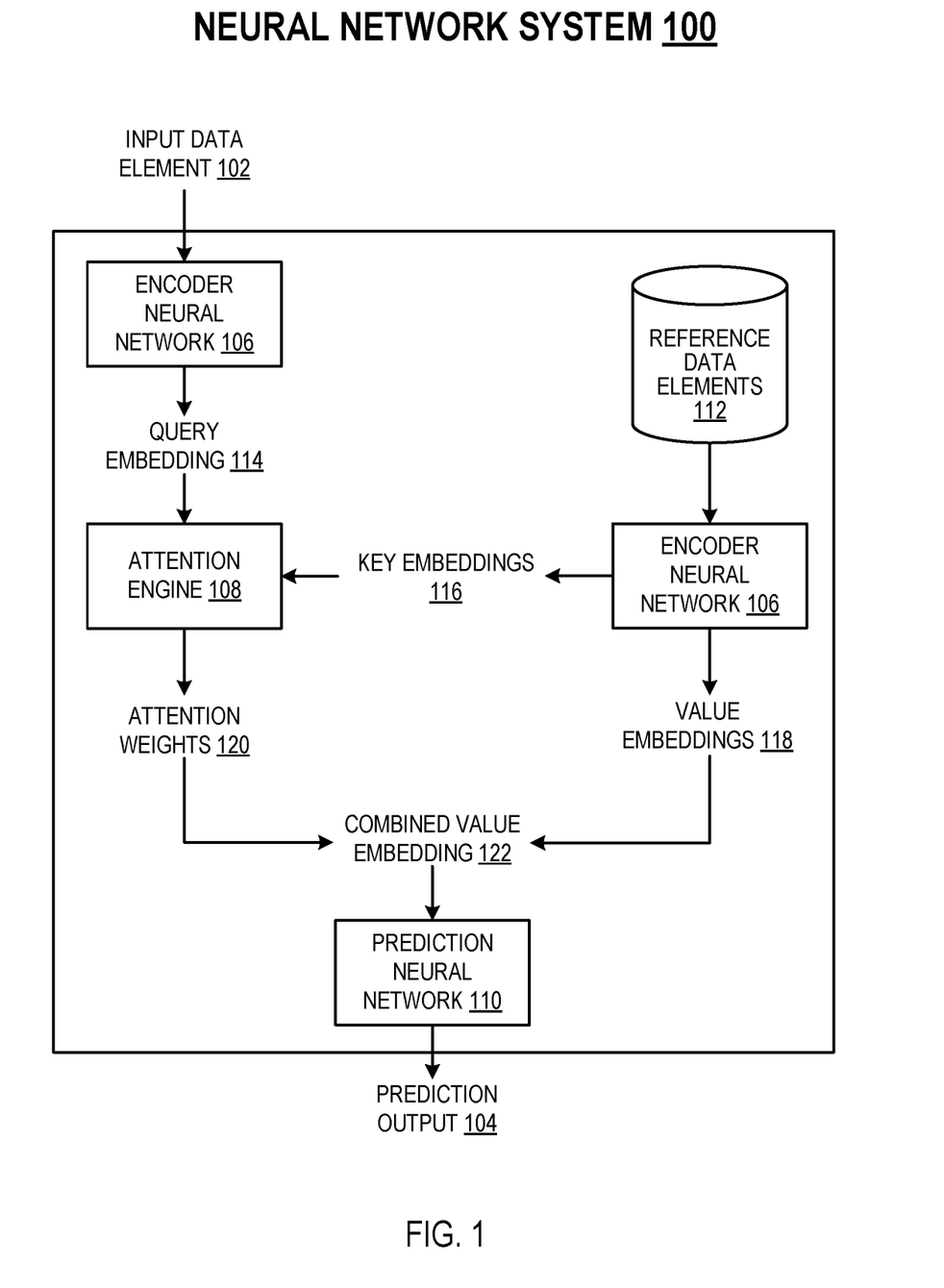
FIG. 1 shows an example neural network system.

FIG. 1 shows an example neural network system 100. The neural network system 100 is an example of a system implemented as computer programs on one or more computers in one or more locations in which the systems, components, and techniques described below are implemented.

The neural network system 100 is configured to process an input data element 102 to generate a corresponding prediction output 104.

The input data element 102 can be any kind of digital data input, e.g., image data, text data, tabular data, or audio data. A tabular data element may be defined by a set of attribute-value tuples, where each attribute-value tuple specifies: (i) an attribute, and (ii) a corresponding value of the attribute. In one example, each tabular data element may represent information relating to a movie, and the attributes may include, e.g., the length of the movie (e.g., measured in minutes), the rating of the movie (e.g., PG-13), the genre of the movie (e.g., thriller), etc.

The prediction output 104 is a collection of numerical values that characterizes the input data element 102. For example, the prediction output may be a classification output that includes a respective score for each of multiple classes, where the score for a class indicates a likelihood that the input data element 102 is from the class. The predicted class of a network input may be identified, e.g., as the class having the highest score according to the prediction output 104.

The neural network system 100 described herein is widely applicable and is not limited to one specific implementation. However, for illustrative purposes, a few example implementations of the neural network system 100 are described next.

In some implementations, the input data element 102 include an image or features derived from an image, and the prediction output 104 may be a classification output that specifies the class of the image. In one example, the class of an image may specify whether the image depicts a particular type of object, e.g., vehicle, pedestrian, road sign, etc. In another example, the class of a medical image may specify a medical condition of a patient depicted in the medical image. In another example, the class of an image may specify a type of action (e.g., sitting, standing, running, etc.) being performed by a person depicted in the image.

In some implementations, the input data element 102 may include a sequence of text, and the prediction output 104 may be a classification output that specifies the class of the text. In one example, the class of a sequence of text may specify a topic of the text (e.g., science, politics, business, etc.).

In some implementations, the input data element 102 may include a sequence of audio data samples, and the class of the network input may specify a phoneme, grapheme, character, or word corresponding to the audio data samples.

The neural network system 100 includes an encoder neural network 106, an attention engine 108, a prediction neural network 110, and a set of reference data elements 112, each of which will be described in more detail next.

The reference data elements 112 (which may also be referred to as "training data elements") are a set of data elements that are maintained by the neural network system 100, e.g., in a physical data storage device or in a logical data storage area. The reference data elements 112 generally have the same format as the input data elements 102, e.g., an image data format, an audio data format, or a text data format. In implementations where the neural network system 100 is configured to generate a classification output, the set of reference data elements 112 may include at least one reference data element from each possible class. The neural network system 100 uses the reference data elements 112 to generate the prediction output 104 for an input data element 102, as will be described in more detail below.

The encoder neural network 106 is configured to process a data element to generate one or more embeddings of the data element. An embedding of a data element refers to an ordered collection of numerical values representing the data element, e.g., a vector or matrix of numerical values. The encoder neural network 106 may generate three different types of embeddings of a data element: (i) a "query" embedding, (ii) a "key" embedding, and (iii) a "value" embedding. Generally, the query, key, and value embeddings of a data element may each be different, and the neural network system 100 uses the query, key, and value embeddings of a data element in respective ways that will be described in more detail below.

The encoder neural network 106 includes a query embedding neural network that is configured to generate query embeddings, a key embedding neural network that is configured to generate key embeddings, and a value embedding neural network that is configured to generate value embeddings. In some implementations, the encoder neural network 106 includes a sequence of one or more shared neural network layers which generate an intermediate representation of a data element being processed by the encoder neural network, and respective output heads corresponding to the query, key, and value embedding neural networks. An "output head" refers to a collection of neural network layers that processes the intermediate representation of the data element that is generated by the shared neural network layers to generate an embedding of the data element. In some implementations, the query, key, and value embedding neural networks are separate neural networks (which are collectively included in the encoder neural network 106) that do not share any parameter values.

The neural network system 100 uses the encoder neural network to generate a query embedding 114 of the input data element 102, and a respective key embedding 116 and value embedding 118 of each reference data element 112.

The neural network system 100 then provides: (i) the query embedding 114 of the input data element 102, and (ii) the key embeddings 116 of the reference data elements 112, as an input to the attention engine 108. The attention engine 108 processes the input to determine a respective attention weight 120 corresponding to each reference data element 112. The attention weight 120 corresponding to a reference data element 112 may be represented as a numerical value and characterizes a measure of alignment (i.e. measure of similarity) between the key embedding 116 of the reference data element 112 and the query embedding 114 of the input data element 102.

The attention engine 108 can generate the attention weights 120 in any of a variety of ways. For example, to generate the attention weights 120, the attention engine 108 may determine a respective measure of alignment between the query embedding 114 of the input data element and the key embedding 116 of each reference data element, and thereafter process the measures of alignment using a normalization function. That is, the attention engine 108 may generate the attention weights $(p_{i,j})_{j=1}^N$, where $p_{i,j}$ denotes the attention weight between the input data element indexed by i and the reference data element indexed by j and N denotes the total number of reference data elements, as:

$$(p_{i,j})_{j=1}^N = n\left(\frac{[\mathcal{A}(q_i, k_j)]_{j=1}^N}{a}\right) \quad (1)$$

where $\mathcal{A}(q_i,k_j)$ denotes a measure of the alignment between the query embedding $q_i$ of the input data element indexed by i and the key embedding $k_j$ of the reference data element indexed by j, n(•) denotes the normalization function, and a is a constant. The measure of alignment $\mathcal{A}$ (•,•) may be, e.g., a dot product (i.e., inner product), and the normalization function may be, e.g., a softmax function or a sparsemax function (as described with reference to: Andre F. T. Martins and Ramon Fernandez Astudillo, "From softmax to sparsemax: a sparse model of attention and multi-label classification," in *Proceedings of the 33rd International Conference on Machine Learning*, New York, NY, USA, 2016). In some implementations, each of the attention weights 120 may be a non-negative value (e.g., a value in the range [0,1]), and the sum of the attention weights may be equal to 1.

After generating the attention weights 120 corresponding to the reference data elements 112, the neural network system 100 processes: (i) the attention weights 120, and (ii) the value embeddings 118 of the reference data elements 112, to generate a combined value embedding 122. In one example, the neural network system 100 may generate the combined value embedding 122 as a linear combination of the value embeddings 118 of the reference data elements weighted by the attention weights 120, e.g., the combined value embedding $c_i$ corresponding to the input data element indexed by i may be given by:

$$c_i = \sum_{j=1}^{N} p_{i,j} \cdot v_j \quad (2)$$

where N denotes the total number of reference data elements, j indexes the reference data elements, and denotes the attention weight between the input data element indexed by i and the reference data element j, and $v_j$ denotes the value embedding of reference data element j.

Optionally, the neural network system 100 may process the input data element 102 using the encoder neural network 106 to generate a corresponding value embedding, and thereafter determine the combined value embedding 122 based at least in part on the value embedding of the input data element 102. In one example, the neural network system 100 may generate the combined value embedding as a linear combination of the value embeddings of: (i) the input data element, and (ii) the reference data elements weighted by the attention weights, e.g., the combined value embedding $c_i$ for the input data element indexed by i may be given by:

$$c_i = \alpha \cdot v_i + (1 - \alpha) \cdot \sum_{j=1}^{N} p_{i,j} \cdot v_j \quad (3)$$

where N denotes the total number of reference data elements, j indexes the reference data elements, $p_{i,j}$ denotes the attention weight between the input data element indexed by i and the reference data element indexed by j, $v_j$ denotes the value embedding of reference data element j, $v_i$ denotes the value embedding of the input data element indexed by i, and a is a hyper-parameter, e.g., a numerical value in the range [0,1].

After generating the combined value embedding 122, the neural network system 100 processes the combined value embedding 122 using the prediction neural network 110 to generate the prediction output 104. The prediction output 104 may be, e.g., a classification output, as described above.

The attention weight 120 corresponding to a reference data element 112 specifies the contribution made by the reference data element 112 to the combined value embedding 122, and by extension, to the prediction output 104 generated by the neural network system 100 for the input data element 102. Therefore, a user of the neural network system 100 can interpret the rationale used by the neural network system 100 to generate the prediction output 104 by examining a proper subset of the reference data elements 112 with the highest attention weights 120 (referred to as "prototype" reference data elements). For example, a user may identify the top-N reference data elements with the highest attention weights 120 as prototype reference data elements, where N may be 3, 5, 10, or any other appropriate number.

The prototype reference data elements may be understood as reference data elements having similar characteristics to the input data element 102 that the neural network system 100 relies upon to generate the prediction output 104. Examples of prototype data elements corresponding to certain input data elements are illustrated with reference to FIG. 2. In some implementations, the neural network system 100 may provide the prototype reference data elements to a user of the neural network system along with the prediction output 104, e.g., through an application programming interface (API) made available by the neural network system 100.

The rationale used by the neural network system 100 to generate the prediction output 104 may be particularly interpretable if the attention weights 120 are "sparse," i.e., close to zero for many of the reference data elements 112. To facilitate the generation of the sparse attention weights 120, the neural network system 100 may generate the attention weights 120 using a normalization function that encourages sparsity, e.g., the sparsemax normalization function described above. Moreover, the neural network system 100 may be trained using a loss function that encourages sparsity of the attention weights 120, as will be described in more detail below.

In addition to generating the prediction output 104, the neural network system 100 may generate data specifying a "confidence" of the prediction output 104 based on the respective attention weight and class of each reference data element. In one example, the confidence $C_i$ of the prediction output corresponding to the input data element indexed by i may be computed as:

$$C_i = \sum_{j=1}^{N} p_{i,j} \cdot \mathbb{1}(y_j = \hat{y}_i) \quad (4)$$

where N is the total number of reference data elements, j indexes the reference data elements, $p_{i,j}$ is the attention weight between the input data element indexed by i and the reference data element indexed by j, and $\mathbb{1}(y_j=\hat{y}_i)$ denotes an indicator function which is equal to 1 if the class $y_j$ of reference data element j is equal to the predicted class $\hat{y}_i$ of the input data element 102, and 0 otherwise. Generally, the confidence of the prediction output 104 may be higher if the classes of the reference data elements 112 with the highest attention weights 120 agree with the predicted class of the input data element 102.

The neural network system 100 may be trained on a set of training data that includes multiple training examples, where each training examples specifies: (i) a data element, and (ii) the target (i.e., actual) class of the data element. In particular, at each of multiple training iterations, a "batch" (i.e., set) of training examples may be sampled from the training data, and the data elements specified by the training examples in the batch may be processed using the neural network system 100 to generate corresponding prediction outputs. A training engine may determine gradients (i.e., with respect to the parameter values of the neural network system 100) of a loss function that depends on the prediction outputs, and then use the gradients to update the current parameter values of the neural network system 100. The parameter values of the neural network system 100 may include, e.g., the parameter values of the prediction neural network, the parameter values of the encoder neural network, and any other trainable parameters of the neural network system 100. The training engine may determine the gradients using back-propagation techniques, and may use the gradients to update the current parameter values of the neural network system 100 using any appropriate gradient descent optimization technique, e.g., an Adam or RMSprop optimization technique.

In some implementations, the loss function £ may be given by:

$$\mathcal{L} = \mathcal{L}_{classification} + \lambda_{sparsity} \mathcal{L}_{sparsity} + \lambda_{confidence} \mathcal{L}_{confidence} \quad (5)$$

where $\mathcal{L}_{classification}$ measures the classification accuracy of the prediction outputs, $\mathcal{L}_{sparsity}$ measures the sparsity of the attention weights, $\mathcal{L}_{confidence}$ characterizes the confidence of the prediction outputs, and $\lambda_{sparsity}$ and $\lambda_{confidence}$ are constants.

In one example, $\mathcal{L}_{classification}$ may be computed as a combination (e.g., a linear combination) of classification error terms $\mathcal{L}_c(\alpha)$ with different values of $\alpha$, where $\mathcal{L}_c(\alpha)$ measures an error (e.g., a cross-entropy error) between: (i) the target class of a data element, and (ii) the predicted class of the data element, where the prediction output is generated using a combined value embedding given by equation (3) and the value of $\alpha$ paramterizing $\mathcal{L}_c(\alpha)$ specifies the value of $\alpha$ in equation (3). In a particular example, $\mathcal{L}_{classification}$ may be computed as:

$$\mathcal{L}_{classification} = \beta_1 \mathcal{L}_c(0) + \beta_2 \mathcal{L}_c(1) + \beta_3 \mathcal{L}_c(0.5) \quad (6)$$

where $\beta_1$, $\beta_2$, and $\beta_3$ are constants. Optimizing $\mathcal{L}_{classification}$ encourages the neural network system 100 to generate prediction outputs that match the target outputs specified by the training examples.

In one example, $\mathcal{L}_{sparsity}$ may be computed as:

$$\mathcal{L}_{sparsity} = \sum_i \sum_{j=1}^{N} p_{i,j} \log(p_{i,j} + \epsilon) \quad (7)$$

where N is the total number of reference data elements, i indexes the input data elements in the current batch of training examples, $p_{i,j}$ is the attention weight between the input data element indexed by i and the reference data element indexed by j, and $\epsilon$ is a small positive constant for numerical stability. Optimizing $\mathcal{L}_{sparsity}$ encourages the neural network system 100 to generate sparse attention weights, i.e., where many of the attention weights are approximately zero.

In one example, $\mathcal{L}_{confidence}$ may be computed as:

$$\mathcal{L}_{confidence} = \sum_i \sum_{j=1}^{N} p_{i,j} \cdot \mathbb{1}(y_j = y_i) \quad (8)$$

where N is the total number of reference data elements, i indexes the input data elements in the current batch of training examples, j indexes the reference data elements, $p_{i,j}$ is the attention weight between the input data element indexed by i and the reference data element indexed by j, and $\mathbb{1}(y_j = y_i)$ denotes an indicator function which is equal to 1 if the class $y_j$ of reference data element j is equal to the target (i.e., actual) class $y_i$ of the input data elementi, and 0 otherwise. Optimizing $\mathcal{L}_{confidence}$ encourages the neural network system 100 to generate higher attention weights for reference data elements from the same class as the input data element.

After training is complete, the neural network system 100 may pre-compute key embeddings and value embeddings of each of the reference data elements 112, i.e., by processing the reference data elements 112 using the trained encoder neural network 106 and storing the resulting key and value embeddings. The neural network system 100 may thereafter use the pre-computed key and value embeddings of the reference data elements 112 to reduce latency during processing of input data elements.

Generally, the encoder neural network 106 and the prediction neural network 110 can have any appropriate neural network architectures that enable them to perform their described operations, e.g., feed-forward or recurrent neural network architectures, with any appropriate types of neural network layers or blocks, e.g., convolutional layers, fully-connected layers, or residual blocks. In one example, the encoder neural network 106 may include a sequence of shared convolutional neural network layers, and respective output heads corresponding to the query, key, and value embedding neural networks that are each implemented as a sequence of fully-connected neural network layers. In another example, the prediction neural network 110 may have a fully-connected neural network architecture.

Figure 2:
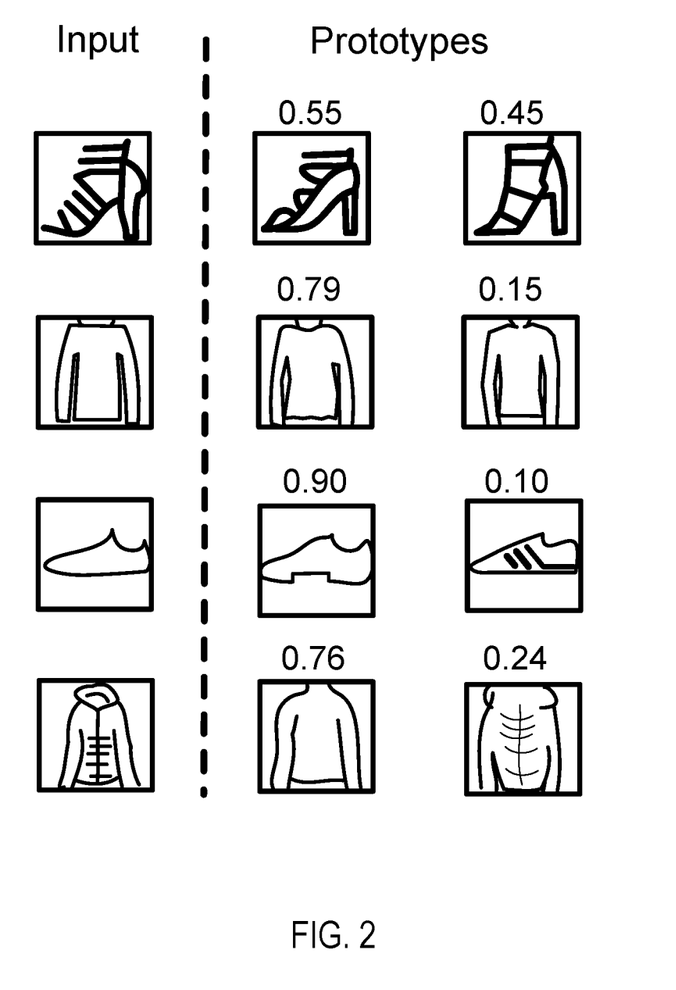
FIG. 2 illustrates examples of: (i) input data elements, and (ii) prototype reference data elements corresponding to the input data elements.

FIG. 2 illustrates examples of: (i) input data elements, and (ii) prototype reference data elements corresponding to the input data elements. The numerical value indicated above each prototype reference data element specifies the corresponding attention weight. It can be appreciated that the prototype data elements share similar characteristics to the corresponding input data elements, which facilitates interpretability of the prediction outputs generated by the neural network system described with reference to FIG. 1.

Figure 3:
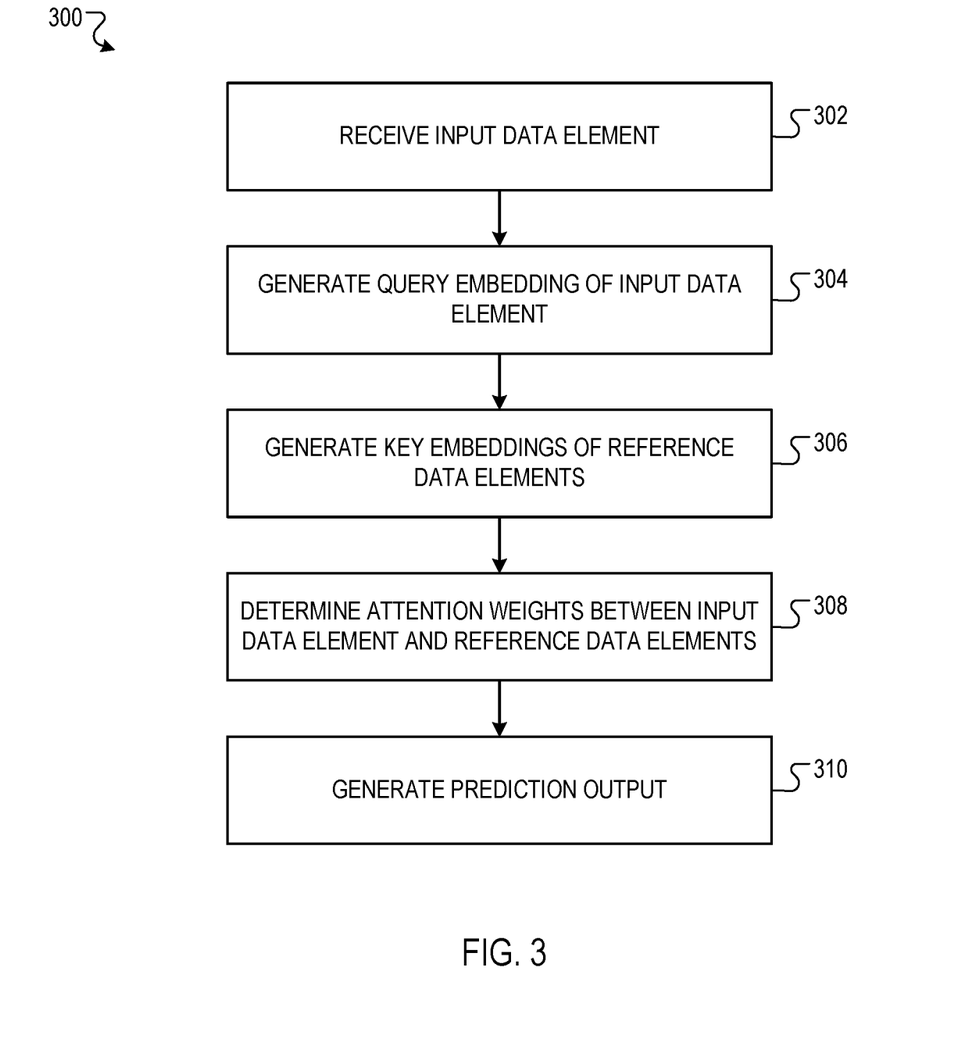
FIG. 3 is a flow diagram of an example process for processing an input data element to generate a prediction output.

FIG. 3 is a flow diagram of an example process 300 for processing an input data element to generate a prediction output. For convenience, the process 300 will be described as being performed by a system of one or more computers located in one or more locations. For example, a neural network system, e.g., the neural network system 100 of FIG. 1, appropriately programmed in accordance with this specification, can perform the process 300.

The system receives an input data element (302).

The system processes the input data element using an encoder neural network to generate a query embedding of the input data element (304).

The system processes each of multiple reference data elements using the encoder neural network to generate a respective key embedding of each reference data element (306). In some implementations, the system may have pre-computed and stored a respective key embedding of each reference data element in a data store. In these implementations, the system may retrieve the key embeddings of the reference data elements from the data store, i.e., rather than dynamically generating them using the encoder neural network in response to receiving the input data element.

The system determines a respective attention weight between the input data element and each reference data element (308). For each reference data element, the system determines the corresponding attention weight based on a measure of alignment between: (i) the query embedding of the input data element, and (ii) the key embedding of the reference data element.

The system generates the prediction output based on at least the attention weights and the reference data elements (310). An example process for generating the prediction output based on the attention weights and the reference data elements is described with reference to FIG. 4.

Figure 4:
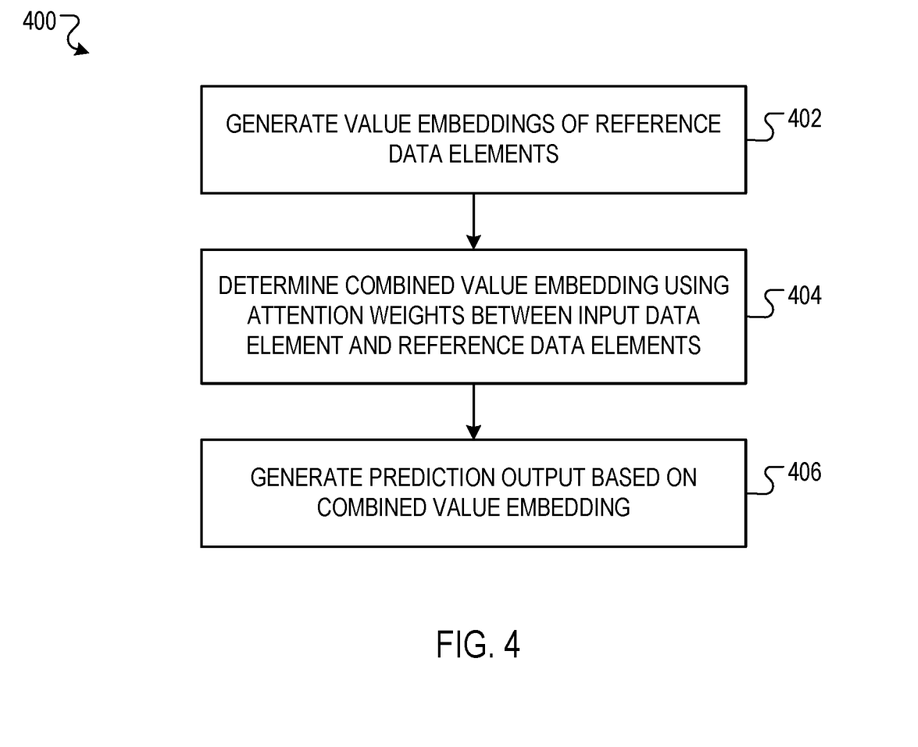
FIG. 4 is a flow diagram of an example process for generating the prediction output for the input data element based on: (i) the attention weights, and (ii) the reference data elements.

FIG. 4 is a flow diagram of an example process 400 for generating the prediction output for the input data element based on: (i) the attention weights, and (ii) the reference data elements. For convenience, the process 400 will be described as being performed by a system of one or more computers located in one or more locations. For example, a neural network system, e.g., the neural network system 100 of FIG. 1, appropriately programmed in accordance with this specification, can perform the process 400.

The system processes each of the reference data elements using the encoder neural network to generate a respective value embedding of each reference data element (402). In some implementations, the system may have pre-computed and stored a respective value embedding of each reference data element in a data store. In these implementations, the system may retrieve the value embeddings of the reference data elements from the data store, i.e., rather than dynamically generating them using the encoder neural network in response to receiving the input data element.

The system determines a combined value embedding of the reference data elements based on: (i) the respective value embedding of each reference data element, and (ii) the respective attention weight between the input data element and each reference data element (404).

The system processes the combined value embedding of the reference data elements using a prediction neural network to generate the prediction output (406).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
   determining a respective attention weight between an input data element and each of a plurality of reference data elements, comprising:
      processing the input data element using an encoder neural network to generate a query embedding of the input data element;
      processing each of the reference data elements using the encoder neural network to generate a respective key embedding of each reference data element; and
      for each reference data element, determining the attention weight between the input data element and the reference data element based on a measure of alignment between the query embedding of the input data element and the key embedding of the reference data element using a sparsemax normalization function;
   generating a prediction output that characterizes the input data element based on at least the attention weights and the reference data elements, comprising:
      processing each of the reference data elements using the encoder neural network to generate a respective value embedding of each reference data element;

determining a combined value embedding of the reference data elements based on (i) the respective value embedding of each reference data element, and (ii) the respective attention weight between the input data element and each reference data element; and processing the combined value embedding of the reference data elements using a prediction neural network to generate the prediction output that characterizes the input data element;

identifying a proper subset of the reference data elements based on the attention weights; and providing the identified proper subset of the reference data elements for use in interpreting the prediction output that characterizes the input data element.

2. The method of claim 1, wherein the input and reference data elements are respective images, and the prediction output characterizes a type of object depicted in the respective images.

3. The method of claim 1, wherein the input and reference data elements are respective sequences of characters or words in a natural language, and the prediction output defines a topic of the respective sequence of characters or words.

4. The method of claim 1, wherein the input and reference data elements are respective tabular data comprising categorical and numerical features, and the prediction output defines a class of the respective tabular data.

5. The method of claim 1, wherein the encoder neural network comprises a query embedding neural network that is configured to generate query embeddings, a key embedding neural network that is configured to generate key embeddings, and a value embedding neural network that is configured to generate value embeddings.

6. The method of claim 1, wherein determining the attention weights between the input data element and the reference data elements comprises:

determining the respective measure of alignment between the query embedding of the input data element and the key embedding of each reference data element; and processing the measures of alignment using a normalization function.

7. The method of claim 1, wherein the encoder neural network is trained using sparse loss function that encourages sparse attention weights.

8. The method of claim 6, wherein determining the measure of alignment between the query embedding of the input data element and the key embedding of a particular reference data element comprises:

determining a dot product between the query embedding of the input data element and the key embedding of the particular reference data element.

9. The method of claim 1, wherein determining a combined value embedding of the reference data elements comprises:

for each reference data element, scaling the value embedding of the reference data element by the attention weight between the input data element and the reference data element; and summing the scaled value embeddings of the reference data elements.

10. The method of claim 1, wherein each reference data element is associated with a respective label that characterizes the reference data element, and further comprising:

determining a confidence of the prediction output that characterizes the input data element based on: (i) the labels of the reference data elements, and (ii) the attention weights between the input data element and the reference data elements.

11. The method of claim 1, further comprising:

determining gradients of a loss function with respect to parameters of one or both of the encoder neural network and the prediction neural network, wherein the loss function comprises a first loss function term that characterizes a difference between: (i) a label that characterizes the input data element, and (ii) the prediction output that characterizes the input data element; and using the gradients of the loss function to adjust values of the parameters of one or both of the encoder neural network and the prediction neural network.

12. The method of claim 11, further comprising:

processing the input data element using the encoder neural network to generate a value embedding of the input data element; and processing the value embedding of the input data element using the prediction neural network to generate a second prediction output that characterizes the input data element, wherein the loss function comprises a second loss function term that characterizes a difference between: (i) the label that characterizes the input data element, and (ii) the second prediction output that characterizes the input data element.

13. The method of claim 11, further comprising:

processing a combination of a value embedding of the input data element and the combined value embedding of the reference data elements using the prediction neural network to generate a third prediction output that characterizes the input data element, wherein the loss function comprises a third loss function term that characterizes a difference between: (i) the label that characterizes the input data element, and (ii) the third prediction output that characterizes the input data element.

14. The method of claim 11, wherein the loss function comprises a sparsity regularization loss function term that encourages sparsity of the attention weights between the input data element and each of the reference data elements.

15. A system comprising:

processing hardware of one or more computers; and memory hardware communicatively coupled to the processing hardware, wherein the memory hardware stores instructions that, when executed by the processing hardware, causes the processing hardware to perform operations comprising:

determining a respective attention weight between an input data element and each of a plurality of reference data elements, comprising:

processing the input data element using an encoder neural network to generate a query embedding of the input data element;

processing each of the reference data elements using the encoder neural network to generate a respective key embedding of each reference data element; and for each reference data element, determining the attention weight between the input data element and the reference data element based on a measure of alignment between the query embedding of the input data element and the key embedding of the reference data element using a sparsemax normalization function;

generating a prediction output that characterizes the input data element based on at least the attention weights and the reference data elements, comprising:
processing each of the reference data elements using the encoder neural network to generate a respective value embedding of each reference data element;
determining a combined value embedding of the reference data elements based on (i) the respective value embedding of each reference data element, and (ii) the respective attention weight between the input data element and each reference data element; and
processing the combined value embedding of the reference data elements using a prediction neural network to generate the prediction output that characterizes the input data element;
identifying a proper subset of the reference data elements based on the attention weights; and
providing the identified proper subset of the reference data elements for use in interpreting the prediction output that characterizes the input data element.

16. The system of claim 15, wherein the input and reference data elements are respective images, and the prediction output characterizes a type of object depicted in the respective images.

17. The system of claim 15, wherein the input and reference data elements are respective sequences of characters or words in a natural language, and the prediction output defines a topic of the respective sequence of characters or words.

18. One or more non-transitory computer storage media storing instructions that when executed by one or more computers cause the one or more computers to perform operations comprising:
determining a respective attention weight between an input data element and each of a plurality of reference data elements, comprising:
processing the input data element using an encoder neural network to generate a query embedding of the input data element;
processing each of the reference data elements using the encoder neural network to generate a respective key embedding of each reference data element; and
for each reference data element, determining the attention weight between the input data element and the reference data element based on a measure of alignment between the query embedding of the input data element and the key embedding of the reference data element using a sparsemax normalization function;
generating a prediction output that characterizes the input data element based on at least the attention weights and the reference data elements, comprising:
processing each of the reference data elements using the encoder neural network to generate a respective value embedding of each reference data element;
determining a combined value embedding of the reference data elements based on (i) the respective value embedding of each reference data element, and (ii) the respective attention weight between the input data element and each reference data element; and
processing the combined value embedding of the reference data elements using a prediction neural network to generate the prediction output that characterizes the input data element;
identifying a proper subset of the reference data elements based on the attention weights; and
providing the identified proper subset of the reference data elements for use in interpreting the prediction output that characterizes the input data element.

19. The non-transitory computer storage media of claim 18, wherein the input and reference data elements are respective images, and the prediction output characterizes a type of object depicted in the respective images.

* * * * *